June 28, 1938. O. B. BROWN 2,122,173
APPARATUS FOR MIXING AND REACTING PURPOSES
Filed Dec. 10, 1935 3 Sheets-Sheet 1
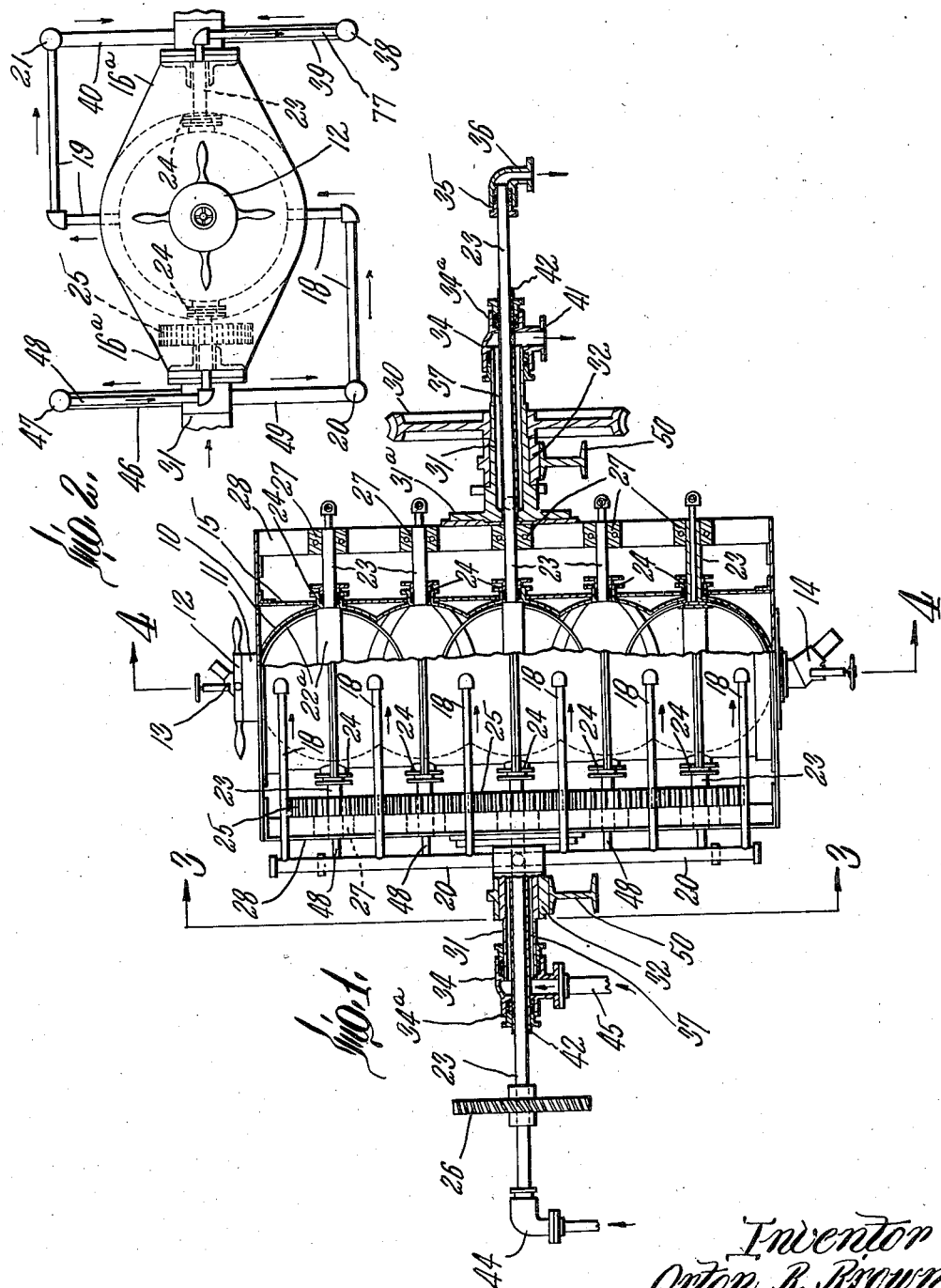

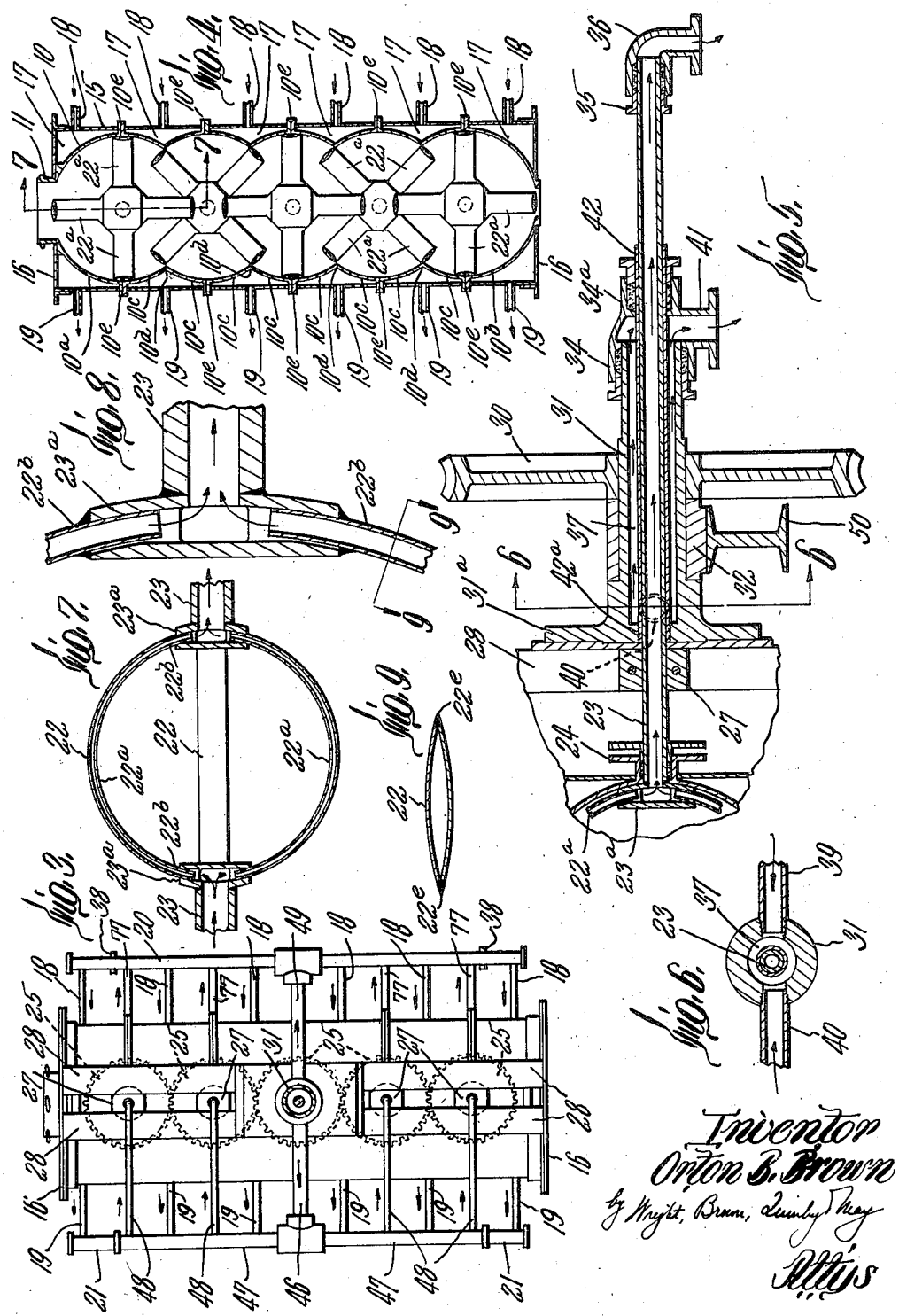

June 28, 1938. O. B. BROWN 2,122,173
APPARATUS FOR MIXING AND REACTING PURPOSES
Filed Dec. 10, 1935 3 Sheets-Sheet 3
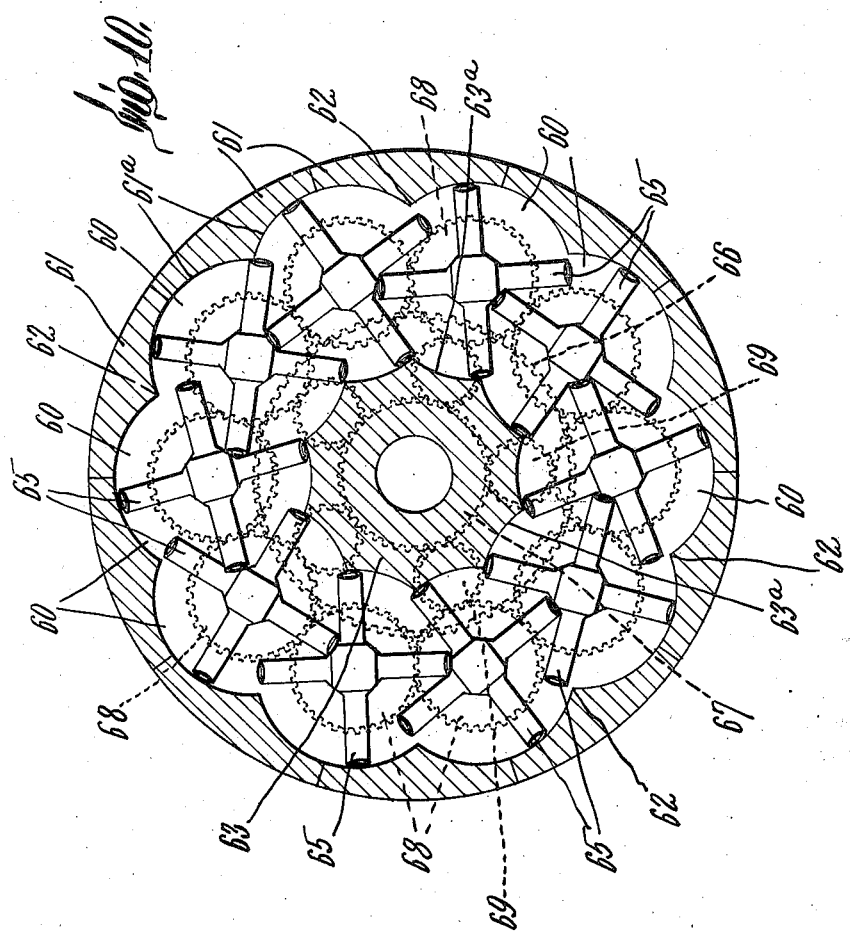
Inventor
Orton B. Brown Patented June 28, 1938

2,122,173

UNITED STATES PATENT OFFICE 2,122,173

APPARATUS FOR MIXING AND REACTING PURPOSES

Orton B. Brown, Berlin, N. H., assignor to Brown Company, Berlin, N. H., a corporation of Maine Application December 10, 1935, Serial No. 53,689

13 Claims. (Cl. 259—3)

This invention relates to apparatus primarily for mixing and reacting purposes, being more particularly concerned with apparatus adapted to work upon liquid or semi-liquid material. An objective of the present invention is to provide apparatus capable of mixing ingredients so intimately and intensively that substantially perfect homogenization of the ingredients takes place even when they are quite resistant to homogenization. Another objective is to provide for such purpose apparatus which is of sizable capacity and which at the same time is characterized by its compactness and ease and sturdiness of construction. Still another objective is to provide apparatus wherein the ingredients may be quickly and indirectly heated or cooled by suitable thermal-change fluid media when heating or cooling is desired in the course of mixing or reacting the ingredients and/or after their mixture or reaction has been completed.

Generally speaking, the apparatus of the present invention comprises a plurality of intercommunicating compartments each of which presents a substantially spherical internal wall surface and contains therein a rotary mixing blade, preferably of hoop form, whose outer edge conforms substantially to and clears the wall surface so as to generate a substantially spherical surface in its rotation. Each mixing blade is preferably hollow and is equipped with means for passing a thermal-change medium therethrough while it is being rotated. The compartments are preferably jacketed and means are preferably also provided for the slow revolvement of all the compartments about an axis perpendicular to the long axis of the apparatus while their mixing blades are undergoing comparatively very rapid rotation and while thermal-change medium is being passed through the compartment jackets as well as through the blades. In order to realize a beating or whipping action on the material in the various compartments, it is desirable that there be in each compartment an agitator comprising a pair of mixing blades of hoop form separated substantially 90° in substantially the same spherical surface and arranged to enter in the course of their rotation in between the blades of an adjacent compartment rotating in an opposite direction and thus to cut through and, by virtue of the intersecting spherical surfaces generated by the outer edges of the blades in adjacent compartments, beat up the whirling or centrifugating material in an adjacent compartment. Each agitator may, if desired, consist of three, four, or even more circular hoops lying in substantially the same spherical surface and interpenetrating the hoops of an adjacent agitator. By virtue of the shape of the mixing compartments and of the mixing blades and the slight, substantially uniform clearance therebetween, the coaction between the blades of adjacent compartments, the high speed at which all blades are being rotated, and the revolvement and tumbling of the contents of all the compartments, a violent centrifugal spattering or splashing of substantially all the material against the compartment walls is had along with intensive cutting or shearing and beating of the material such as makes for extremely intimate mixture and homogenization, particularly since there are no dead pockets or corners in the apparatus in which material can lodge and thus escape the variety of mixing forces at play.

While not limited thereto, the apparatus of the present invention is adapted to accomplish the exactingly thorough mixing or homogenizing action necessary in producing cellulose xanthate solution or viscose syrup in one step from a batch containing the necessary raw materials, that is, the appropriate kind of cellulose fiber and the amount of caustic soda solution and liquid carbon bisulphide calculated to lead to viscose syrup of the desired composition. The chemical aspects of such a one-step xanthating process need not be discussed herein, as these are disclosed and claimed in application, Serial No. 37,043, filed August 20, 1935, by George A. Richter. It is pertinent to observe herein, however, that the commercial utility of such process depends in considerable measure upon the performance of the process in apparatus not only capable of intensively mixing substantially all of the ingredients entering into the xanthating reaction so that in a reasonably short period of time there is very little, if any, fiber residue, but also capable of maintaining the ingredients at the desired temperatures during and after the reaction, as will hereinafter appear. The apparatus of the present invention has been used in carrying out such one-step xanthating process and has proven to have the capabilities required in plant or commercial scale operation.

With the foregoing and other features and objects in view, the present invention will now be described in further detail with particular reference to the accompanying drawings, wherein,—

Figure 1 represents a composite front and vertical sectional view of apparatus as a whole embodying the invention.

Figure 2 is a plan view of the apparatus.

Figure 3 represents a side view of the apparatus looking in the direction of the arrows of line 3—3 of Figure 1.

Figure 4 is a vertical section through the apparatus on the line 4—4 of Figure 1.

Figure 5 is an enlarged section through the supporting, driving, and thermal-change fluid outlet means on one side of the apparatus.

Figure 6 is a detailed section on the line 6—6 of Figure 5.

Figure 7 is a section through a mixer blade on the line 7—7 of Figure 4.

Figure 8 is an enlarged fragmentary section through the blade at a bearing end portion thereof, showing how heating or cooling fluid is discharged from the blade hollow.

Figure 9 is a section on the line 9—9 of Figure 8 and shows the cross-sectional shape of a blade.

Figure 10 illustrates in sectional view a modified form of apparatus whose mixing compartments are in intercommunicating annular array.

As appears in Figures 1 and 4, apparatus embodying the present invention may comprise an elongated inner shell consisting of a series of semi-spherical, intercommunicating compartments or chambers 10 arranged in tandem and each presenting an internal wall surface which is substantially a spherical segment. The spherical internal wall surfaces of the compartments are incomplete or open only where the compartments intercommunicate; and these openings are ample enough to permit ready flow of material from one compartment to another and to allow the mixing blades of one compartment to project in between the mixing blades of the adjacent compartment or compartments, as will hereinafter appear. The shell may consist of a plurality of castings of any suitable metal, but it is preferable that stainless steel or equivalent corrosion-resistant metal be used for this purpose. The uppermost and lowermost castings 10a and 10b may be of generally semi-spherical contour, whereas the intermediate castings may each comprise two semi-spherical sections 10c having a line of juncture 10d therebetween. The various castings or sections may be flanged at their complemental edges 10e and bolted or otherwise secured thereat to define the various compartments. While not limited to any number of compartments and while an even number of compartments may, in fact, be preferable, the shell illustrated contains five compartments, from the uppermost of which projects a collar 11 adapted to receive in clamped relationship thereto a quick-locking cover, for instance, the cover 12 shown in Figures 1 and 2. When the apparatus is used for chemical reaction attended by the liberation of gas, the cover may be equipped with a valved outlet or relief pipe 13 through which gas may be permitted to escape from the sphere of reaction, particularly if the gas interferes with the desired progress of the reaction. The valved outlet is also especially useful for temporary connection to a vacuum pump. For instance, when a xanthating reaction is to be conducted in the apparatus and a vacuum is created therein just before the addition of the carbon bisulphide, the latter may be introduced substantially without the loss of any vapor. Entering into the lowermost compartment may be a valved discharge pipe 14 through which may be withdrawn the mixed or reacted ingredients produced in the apparatus. When the mixed or reacted ingredients are not of a fluent character, however, their discharge may be had through the comparatively large open end afforded by the collar 11, the apparatus being brought to an inverted position and the mixing blades therein being put into operation, if desired, to promote discharge.

Surrounding the inner shell of the apparatus and in spaced relationship thereto is an outer shell 15 which, together with the inner shell, defines a jacket or jacketing space about each of the compartments 10. The jacket is not, however, essential for all uses of the apparatus. Like the inner shell, the outer shell 15 may be formed from separate sections or pieces corresponding in number to the cast sections of the inner shell and secured, as by welding, to the flanges 10e. The outer shell sections may, however, consist of suitable sheet metal welded, riveted, or otherwise seamed into appropriate annular form for enclosing the inner sections. The uppermost and lowermost outer shell sections may be closed off by suitable headers 16. It is thus seen that there is a jacket or jacketing space 17 about each inner shell section, wherefore, suitable jacketing or thermal-change medium, such as steam, hot water, cold water, etc. may be delivered into each of such jacketing spaces for modifying, as desired, the temperature of the ingredients being mixed or reacted in the apparatus. To this end, an inlet pipe 18 and an outlet pipe 19, arranged directly opposite to the inlet pipe, may communicate with each of the jacketing spaces 17, such pipes leading to suitable manifolds 20 and 21, respectively.

Each of the compartments 10 is shown provided with mixing blades of a configuration designed to clear closely and uniformly substantially all internal wall surface and thus not only to mix thoroughly the ingredients in a compartment but to scrape and remove ingredients tending to accumulate on the wall surface and remix them with the batch as a whole. It is thus seen that there is virtually no static material anywhere in a compartment or in the apparatus as a whole, particularly since, as will hereinafter appear, the apparatus as a whole undergoes relatively slow revolvement about the axis of the central compartment so as to induce slow flowage of material from one compartment to another and thereby to ensure mixing action on such material as escapes mixing in one compartment in another compartment. The desired mixing action in each compartment may be had to good advantage from mixing blades in the form of a pair of hoops 22 which, as best shown in Figure 7, are arranged relative to their common supporting trunnions 23 in a manner such that each half hoop circumscribes or generates the same spherical surface in its rotation and is removed 90° from the adjacent blades on the axis of the spherical surface thus generated. Each hoop is shown constructed from two substantially semi-circular parts 22a, each end portion 22b of which is engaged in a socket or holder 23a at the inner end of the corresponding trunnion 23. Each trunnion thus has four such sockets 23a projecting at 90° intervals from its inner end portion and holding the corresponding four ends of the semi-hoops or blade parts 22a. The hoops might, however, be integrally formed as complete circles; or the hoops and trunnions might be integrally cast. The semi-hoops or blade parts 22a in each compartment are so fixed on their trunnions that, as best shown in Figure 4, they enter or project centrally in between the semi-hoops or blades of the adjacent compartment or compartments as the blades in all the compartments are being actuated, as will hereinafter appear, with the blades in one compartment rotating in a direction opposite to that of the blades in an adjacent compartment.

In order to provide a quick temperature change in the ingredients being mixed or reacted in the compartments, it is desirable that the mixing blades be hollow and that while in operation suitable thermal-change medium at the appropriate temperature be circulated therethrough. In this connection, it is to be observed that inasmuch as the mixing blades are constantly and quickly moving through the material in the compartments and are thus contacting with fresh surfaces of material, realization of quick temperature change in the material can be had to better advantage by thermal transfer through the blades than through the compartment walls, even though it may be of advantage to effect thermal transfer in both such ways. Accordingly, as appears in Figures 7 and 8, the hoops 22 and the trunnions 23 therefor are hollow so that the thermal-change medium may be passed through one of the trunnions, thence through the blades, and out through the other trunnion. The hoops or blades 22 may present outwardly convex upper and lower surfaces and sharp side edges 22e for scraping and shearing material from the wall surface barely cleared thereby. Each semi-hoop may be built up by preshaping strips of suitable sheet metal to the appropriate convexity, bending the preshaped strips to semi-circular curvature, as on a mandrel, and uniting the edges of the strips, as by welding, into the sharp blade edges 22e. The hoops may also be constructed by casting or even by flattening a seamless tube.

The hollow trunnions 23 pass through suitable stuffing boxes 24 fixed to the inner shell 10 and surrounded by the outer shell 15, as appears in Figure 1. Fixed to the trunnions 23 on one side of the outer shell are shown intermeshing gears 25, which may be driven by a driving gear 26 deriving its motion from a suitable prime mover (not shown) capable of imparting the desired high speed rotation to the mixing blades. The mixing blades in adjacent compartments are thus rotated in opposite directions. The end portions of the various trunnions may be journaled for rotation in bearings 27 carried by suitable framework 28 which, as shown in Figures 1 and 2, is located in between and suitably secured to oppositely projecting side extensions 16a of the top and bottom headers 16.

As previously indicated, provision is made to revolve the apparatus as a whole about an axis perpendicular to the common axis of the intercommunicating compartments while mixing is taking place in the various compartments and while thermal-change medium is being circulated through the compartment jackets and the hollow mixing blades thereof. The apparatus as a whole may be revolved slowly about the appropriate axis of its central compartment by a worm gear 30 fixed to a hollow trunnion 31 which is journaled for rotation in a suitably supported bearing 32 and whose inner end portion 31a assumes the form of a rectangular flange fixed to one side of the framework 28. The trunnion 23 of the central compartment, unlike those of the other compartments, is elongated and projects beyond its stuffing box 24 and through its bearing 27 in the framework 28, through the hollow of the trunnion 31, through a duplex stuffing box 34 on the outer end of the trunnion 31 and about itself, and thence into a stuffing box connection 35 between itself and a fluid outlet pipe 36. The inner face of the hollow trunnion 31 beyond its inner end portion 31a is spaced from the trunnion 23 so as to define an annular space 37 (Figures 1, 5, and 6) into which the thermal-change fluid from the blades, other than from the blades of the central compartment, and from the jacket-discharge manifold 21 may be exhausted. As shown in Figure 2, the discharge trunnions 23 for the blades, other than the blades in the central compartment, lead by way of pipes 77 into a discharge manifold 38 which enters by way of a pipe 39 through the trunnion 31 into the annular space 37. Similarly, the fluid from the jacket-discharge manifold 21 is conducted by a pipe 40 through the trunnion 31 into the annular space 37; and the fluid thus discharged from both manifolds into the annular space 37 may be exhausted therefrom at its outer end through an outlet opening 41 in the duplex stuffing box 34. Ample bearing area for the hollow trunnion 31 on the hollow trunnion 23 may be provided by a thin elongated sleeve 42 threaded at its inner end portion 42a into the flanged portion 31a and extending clear through to the outer end of the duplex stuffing box 34. The hollow trunnion 31 is thus free for rotation about the hollow trunnion 23 and the hollow trunnion 23 is thus also free for rotation within the hollow trunnion 31 while both trunnions are serving as discharge conductors for the thermal-change medium passing thereinto. It might be noted that the outer stuffing box 34a of the duplex stuffing box 34 surrounds the sleeve 42 so as to afford the desired fluid-tight journal therefor. It might be remarked that the long hollow trunnion 23 required for the central compartment in an odd-numbered plurality of compartments and the parts adjunctive to such a trunnion are eliminated when the apparatus contains, say, two, four, or six compartments. However, an apparatus containing an odd-numbered plurality of compartments was chosen for the purpose of illustration in order to demonstrate the applicability of the principles of the present invention to a more difficult form of design from which the design of apparatus containing an even number of compartments is at once obvious to the experienced machine builder and hence need not be illustrated or described.

Excepting for the driving gear 30, the trunnion 23 at the fluid-intake side of the central compartment is associated with various elements similar to those hereinbefore described in association with the trunnion at the discharge end of the central compartment. The fluid-inlet pipe leading into the outer end of the fluid-inlet trunnion 23 has been designated by the numeral 44 to distinguish it from the fluid-outlet pipe 36; and, similarly, the fluid-inlet pipe leading into the duplex stuffing box 34 has been designated by the numeral 45 to distinguish it from the fluid-outlet pipe 41. The fluid-inlet trunnion 23 has affixed thereto outwardly of the stuffing box 34 the driving gear 26, which, as hereinbefore stated, serves to drive the train of gears 25 affixed to the various other inlet trunnions 23. It is thus seen that thermal-change fluid for the blades of the central compartment passes through the pipe 44 and the inlet trunnion 23 into and through such blades and through the discharge trunnion 23 and the outlet pipe 36, whereas, on the other hand, thermal-change fluid for the blades of the other compartments enters from the pipe 45 into the annular space 37 of the intake trunnion 31, passes from such space into a pipe 46 leading to an intake manifold 47, arranged opposite to the jacket-discharge manifold 21, and thence by way of pipes 48 into the inlet trunnions 23 for the blades of the other compartments. The thermal-change fluid for the jackets of the various compartments proceeds from the inlet annular space 37 through a pipe 49 into a manifold 20 which delivers the medium into the jackets by way of the pipes 18, the medium passing from the jackets by way of the pipes 19, the manifold 21, the pipe 40, and the annular discharge space 37, into the outlet pipe 41, as previously described.

The apparatus as a whole may be supported in any approved manner, the supports shown being I-beams to which the bearings 32 are fixed and which may in turn be fixed to rugged standards anchored solidly in a suitable foundation or floor, such as concrete. The gear 30 may be driven through a suitable speed-reduction box from an electric motor or other prime mover at a rate of speed such that the apparatus as a whole makes comparatively few revolutions in comparison with the number of revolutions of the mixing blades of the various compartments, thereby enabling the mixing blades in each compartment to mix material therein thoroughly before the material flows into an adjacent compartment for further thorough mixing action. Thus, the agitator blades or hoops may make 100 or more R. P. M. while the whole apparatus is tumbling at 1 R. P. M. Under the conditions of operation of the apparatus, every vestige of the material is hence subjected repeatedly to intensive mixing action, since even the thin films cleared by the blades in the several mixing compartments are induced through the revolvement of the apparatus as a whole to flow away from the wall and be commingled with the main batch of the material.

In lieu of arranging the mixing compartments in tandem, as hereinbefore described, it is possible to adopt the arrangement shown somewhat schematically in Figure 10, according to which a plurality of semi-spherical compartments 60 are in annular array. Such compartments may be defined by a plurality of outer sections 61 of spherical outer curvature presenting internal spherical wall surfaces 61a and lines of juncture 62 between such spherical wall surfaces and further by a solid axial piece 63 suitably joined with the sections 61 and presenting a plurality of internal spherical wall surfaces 63a lying in and forming part of the same spherical surface as the wall surfaces 61a. A pair of hoop-shaped blades 65 similar to those already described may be provided for each compartment; and the apparatus as a whole may be revolved slowly by a driven gear 66 at one end portion of the piece 63. A separately driven gear 67 loose on the same end portion of the piece 63 drives gears 68 fixed to the blade trunnions (not shown) through idler gears 69, the blades being thereby rotated at comparatively very high speed. The manner in which the apparatus of Figure 10 may be opened, equipped with a jacket, or thermal-change medium circulated through the mixing blades thereof, and such parts as trunnions, bearings, stuffing boxes, etc. as are necessary to the completion thereof, have not been shown, as these features can be supplied pursuant to the principles of the present invention inhering in the complete form of apparatus that is illustrated and described herein in detail.

It has already been indicated that the apparatus of the present invention can be advantageously used for carrying out a one-step process, so-called, of making cellulose xanthate solution or viscose syrup. To this end, caustic soda solution of appropriate causticity, for instance, one of 9% caustic soda content, based on the weight of the mixed reacting ingredients or xanthate solution being prepared, may be added to the mixing compartments and water or other suitable medium may be passed through the compartment jackets and the mixing blades while only the blades are in operation so as to bring the caustic soda solution to a temperature of, say, 20° C. While only the mixing blades of the apparatus are still in operation, the appropriate kind of cellulose fiber may be added to the solution, for instance, in the form of wood pulp sheets or shreds and in dry or moist condition, in amount calculated to produce a xanthate solution of, say, 9% cellulose content, that is, in the amount of 9%, based on the weight of all the ingredients to be reacted to produce the xanthate solution. The uppermost compartment may then be closed and the mixing of the caustic soda solution and cellulose fiber at about 20° C. may be continued with revolvement of the apparatus for about thirty to sixty minutes, at the end of which time a thick suspension of heavy cream consistency is had. Immediately before stopping the apparatus at such time, it is preferable that the thick suspension be cooled to about 15° C. by circulating cooling water or other suitable medium through the compartment jackets and the mixing blades. To the preferably cooled, thick cellulose fiber suspension is then added through the uppermost compartment about 35% to 40% of liquid carbon bisulphide, based on the dry weight of the cellulose fiber; and such addition is preferably made while the apparatus as a whole is idle so as to avoid, so far as possible, sensible loss of the carbon bisulphide by evaporation. The uppermost compartment is then closed and the apparatus as a whole again set in operation and operation continued for a period of about three hours while its contents are preferably kept at about 15° C. When the apparatus is stopped at the end of this period, it is found that substantially all the ingredients have reacted to form a cellulose xanthate solution or viscose syrup of a cellulose and caustic soda content of 9% each. The viscose syrup thus prepared may be diluted with water while still in the apparatus to any desired concentration, for instance, to a cellulose and caustic soda content of, say, 7% each. A solution diluted to a concentration of, say, 7% cellulose and caustic soda each is that usually desired in the manufacture of viscose silk and pellicles of regenerated cellulose, but it is obvious that more dilute solutions, such as may be desired for the sizing of papers and textiles, may be prepared, since no difficulty whatever is had in quickly and uniformly diluting the solution originally prepared. Dilution of the solution may be effected by adding water thereto with only the mixing blades operating, cooling water preferably being sent through the compartment jackets and the blades so as to keep the solution as it is being diluted at a temperature of about 15° C. Only a few minutes running of the blades is required to effect a uniform dilution of the solution to the final desired concentration. In those instances when ripening of the solution is desired, as when the solution is to serve in the manufacture of viscose silk or pellicles of regenerated cellulose, the solution, after being adjusted, if desired, with diluting water to a cellulose and caustic soda content of, say, 7% each, may be ripened while still in the apparatus by passing a suitable heating medium, such as hot water, through the blades as they are running and through the compartment jackets. Thus, the viscose solution may be brought to a temperature of, say, about 100° to 125° F., by circulating hot water through the compartment jackets and mixing blades while the apparatus as a whole is in operation; and this temperature may be reached in, say, about ten minutes and maintained for, say, about 1½ to 2 hours, at the end of which time the solution or syrup may have the appropriate ripeness or maturity for spinning or casting purposes. Once the proper ripeness has been produced in the syrup, which condition can be ascertained by testing samples from the batch being ripened, the ripened batch may be quickly cooled while the apparatus as a whole is still running, to a temperature of, say, about 15° C. or lower, at which temperature the desired degree of ripeness attained in the syrup may be substantially fixed or arrested so that the syrup may be withdrawn from the lowermost compartment of the apparatus and kept at such temperature in suitable storage tanks without spoilage or gelling for the usual period of time to permit conversion into the silk, films, or other ultimate products for which it is intended.

While I have hereinbefore indicated a very exacting service to which the apparatus of the present invention may be put, it is to be understood that it is capable of serving to excellent advantage a wide variety of uses. Thus, the apparatus of the present invention is well-suited for homogenizing all kinds of liquid or semi-liquid materials, particularly food products, such as milk, cream, ice cream, mayonnaise, etc., in which latter connection it presents the very desirable feature of being easily cleaned after use. It may also be used to advantage in making liquid or semi-liquid dispersions or emulsions of many kinds of materials, including aqueous dispersions of various thermoplastic materials such as bitumens, waxes, etc. and aqueous emulsions of oils and other water-immiscible liquids, since it produces dispersions and emulsions of extremely fine particle size. In making aqueous dispersions of such thermoplastic materials as bitumens and waxes, it enables the maintenance of the thermoplastic material in molten condition during the dispersing or mixing period and thus induces a resolution of such materials into particles of colloidal dimensions, particularly, when the mixing action takes place in the presence of suitable protective colloids. It is also extremely efficient for dissolving purposes and is of value in those instances when high rate of dissolution of a body in a liquid is desired. And it can be used advantageously for promoting chemical reaction between ingredients of liquid or semi-liquid nature when such ingredients must be intimately mixed and/or heated in order to react at a satisfactory rate or to the desired degree. In any case, the compartments are preferably not filled with the material being acted upon, there being sufficient vacant compartment space in the apparatus as it is being operated to allow the desired turbulent mixing therein coupled with ready flow of one material from one compartment into another.

It is to be understood that the expression "substantially spherical wall surface" used in the foregoing description and in the appended claims to characterize the compartment walls is to be construed as including ellipsoidal surfaces approaching spherical surfaces in their curvatures or contours and, indeed, any other suitable surface of revolution, so long as the agitator blades are so formed as to generate a similar surface with approximately uniformly slight clearance, the essential requirement being that there should be no dead corners or recesses where unmixed material might pack in. Thus, a series of intersecting conical frustums might serve the purpose of affording suitable surface of revolution even though from the standpoint of ease of construction and excellence of results, I consider spherical wall surfaces and hoop-shaped mixing blades to be preferable. The expression "hoop form" similarly used to characterize the compartment blades is to be construed in a way comporting with the construction of the expression "substantially spherical wall surface", which construction will, of course, include blades of elliptical form approaching hoops or rings in their curvatures and hence generating in their rotation ellipsoidal surfaces approaching spherical surfaces in their curvatures or contours. It is to be further understood that the inventive principles or features herein disclosed might be embodied in forms of apparatus other than those herein specifically described and illustrated and, accordingly, that the spirit and scope of the invention are to be ascertained from the appended claims.

I claim:—

1. Apparatus of the class described comprising a plurality of intercommunicating compartments each presenting an internal wall surface which is substantially entirely a spherical segment, a mixing blade mounted for rotation in each compartment and having an outer edge substantially conforming to and only slightly clearing said wall surface, means for rotating said blades to cause said blade edges to generate substantially spherical surfaces and thus repeatedly to remove substantially completely material being mixed from said surfaces, and means for revolving said apparatus as a whole, while said blades are being rotated, about an axis that results in flow of material being mixed back onto said surfaces.

2. Apparatus of the class described comprising a plurality of intercommunicating compartments each presenting an internal wall surface which is substantially entirely a spherical segment, a mixing blade of hoop form mounted for rotation in each compartment and having an outer edge substantially conforming to and only slightly clearing said wall surface, means for rotating said blades to cause said blade edges to generate substantially spherical surfaces and thus repeatedly to remove substantially completely material being mixed from said surfaces, and means for revolving said apparatus as a whole, while said blades are being rotated, about an axis that results in flow of material being mixed back onto said surfaces.

3. Apparatus of the class described comprising a plurality of intercommunicating compartments each presenting an internal wall surface which is substantially entirely a spherical segment, a pair of blades of hoop form mounted for rotation in each compartment and having outer edges substantially conforming to and only slightly clearing said wall surface, the blades of each pair being separated substantially 90° and the blades in one compartment being arranged to enter in the course of their rotation in between the blades of an adjacent compartment so that the outer edges of the blades in adjacent compartments are capable of generating intersecting spherical surfaces, means for rotating said blades to cause said blade edges to generate such substantially spherical surfaces and thus repeatedly to remove substantially completely material being mixed from said internal wall surfaces, and means for revolving said apparatus as a whole, while said blades are being rotated, about an axis that results in flow of material being mixed back onto said internal wall surfaces.

4. Apparatus of the class described comprising a plurality of intercommunicating coaxial compartments each presenting an internal wall surface which is substantially a spherical segment, a mixing blade of hoop form mounted for rotation in each compartment and having an outer edge substantially conforming to and clearing said wall surface, means for rotating said blades to cause said blade edges to generate substantially spherical surfaces, and means for revolving said apparatus as a whole, while said blades are being rotated, about an axis perpendicular to the common axis of said intercommunicating compartments.

5. Apparatus of the class described comprising a plurality of intercommunicating coaxial compartments each presenting an internal wall surface which is substantially a spherical segment, a pair of blades of hoop form mounted for rotation in each compartment and having outer edges substantially conforming to and clearing said wall surface, the blades of each pair being separated substantially 90° and the blades in one compartment being arranged to enter in the course of their rotation in between the blades of an adjacent compartment, means for rotating said blades to cause said blade edges to generate substantially spherical surfaces, and means for revolving said apparatus as a whole while said blades are being rotated, about an axis perpendicular to the common axis of said intercommunicating compartments.

6. Apparatus of the class described comprising a plurality of intercommunicating coaxial compartments arranged in tandem and each presenting an internal wall surface which is substantially a spherical segment, a mixing blade mounted for rotation in each compartment and having an outer edge substantially conforming to and clearing said wall surface, means for rotating said blades to cause said blade edges to generate substantially spherical surfaces, and means for revolving all said compartments about an axis substantially midway of and perpendicular to the common axis of said intercommunicating compartments as said blades are being rotated.

7. Apparatus of the class described comprising a plurality of intercommunicating coaxial compartments arranged in tandem and each presenting an internal wall surface which is substantially a spherical segment, a pair of blades of hoop form mounted for rotation in each compartment and having outer edges substantially conforming to and clearing said wall surface, the blades of each pair being separated substantially 90° and the blades in one compartment being arranged to enter in the course of their rotation in between the blades of an adjacent compartment, means for rotating said blades to cause said blade edges to generate substantially spherical surfaces, and means for revolving all said compartments about an axis substantially midway of and perpendicular to the common axis of said intercommunicating compartments as said blades are being rotated.

8. Apparatus of the class described comprising a plurality of intercommunicating coaxial compartments arranged in tandem and each presenting an internal wall surface which is substantially a spherical segment, a hollow mixing blade arranged in each compartment and having an outer edge substantially conforming to and clearing said wall surface, a pair of hollow trunnions supporting each blade and passing through the wall of each compartment, the hollows of said trunnions communicating with the hollow of said blade and one trunnion constituting a fluid-inlet and the other a fluid-outlet, means for rotating said trunnions to cause rotation of said blades and said blade edges to generate substantially spherical surfaces, means for revolving all said compartments about an axis substantially midway of and perpendicular to the common axis of said intercommunicating compartments as said blades are being rotated, and means for delivering thermal-change fluid medium through the fluid-inlet trunnions and blades and thence out through the fluid-outlet trunnions while said compartments are being revolved and said blades are being rotated.

9. Apparatus of the class described comprising a plurality of jacketed and intercommunicating coaxial compartments arranged in tandem and each presenting an internal wall surface which is substantially a spherical segment, a hollow mixing blade arranged in each compartment and having an outer edge substantially conforming to and clearing said wall surface, a pair of hollow trunnions supporting each blade and passing through the wall of each compartment, the hollows of said trunnions communicating with the hollow of said blade and one trunnion constituting a fluid-inlet and the other a fluid-outlet, means for rotating said trunnions to cause rotation of said blades and said blade edges to generate substantially spherical surfaces, means for revolving all said compartments about an axis substantially midway of and perpendicular to the common axis of said intercommunicating compartments as said blades are being rotated, and means for delivering thermal-change fluid medium through the jackets of said compartments and through the fluid-inlet trunnions and blades and thence out through the fluid-outlet trunnions while said compartments are being revolved and said blades are being rotated.

10. Apparatus of the class described comprising an odd-numbered plurality of intercommunicating jacketed compartments arranged in tandem and each presenting an internal wall surface which is substantially a spherical segment, a hollow mixing blade arranged in each compartment and having an outer edge substantially conforming to and clearing said wall surface, a pair of hollow trunnions supporting each blade and passing through the wall of each compartment, the hollows of said trunnions communicating with the hollow of said blade and one trunnion constituting a fluid-inlet and the other a fluid-outlet, means for rotating said trunnions to cause rotation of said blades and said blade edges to generate substantially spherical surfaces, means for revolving all said compartments about the trunnions of the central compartment as said blades are being rotated, fluid-inlet connections between the fluid-inlet trunnion of said central compartment and the fluid-inlet trunnions of said other compartments and also between the fluid-inlet trunnion of said central compartment and the jackets of all said compartments, fluid-outlet connections between the fluid-outlet trunnion of said central compartment and the fluid-outlet trunnions of the other compartments and also between the fluid-outlet trunnion of said central compartment and the jackets of all said compartments, and means for delivering thermal-change fluid medium into the fluid-inlet trunnion of said central compartment while said compartments are being revolved and said blades are being rotated.

11. Apparatus of the class described comprising a plurality of intercommunicating coaxial compartments in annular array each presenting a substantially spherical internal wall surface, a mixing blade of hoop form mounted for rotation in each compartment and having an outer edge substantially conforming to and clearing said wall surface, means for rotating said blades to cause said blade edges to generate substantially spherical surfaces, and means for revolving all said compartments about the axis of said annular array.

12. Apparatus of the class described comprising a plurality of intercommunicating compartments each presenting an internal wall surface constituting a surface of revolution, a rotary mixing and scraping blade in each compartment whose scraping edge is substantially coextensive with and only slightly clears said wall surface, means for rotating said blades to cause their scraping edges to generate said surfaces of revolution and thus repeatedly to scrape substantially all said wall surfaces, and means for revolving said apparatus as a whole, while said blades are being rotated, about an axis that results in flow of material being mixed back onto said wall surfaces.

13. Apparatus of the class described comprising a plurality of intercommunicating compartments each presenting an internal wall surface constituting a surface of revolution, rotary mixing and scraping blades in each compartment whose scraping edges are substantially coextensive with and only slightly clear said internal wall surface, the blades in one compartment being arranged to enter in the course of their rotation in between the blades of an adjacent compartment so that the blades of adjacent compartments are capable of generating intersecting surfaces of revolution, means for rotating the blades in all of said compartments to cause their scraping edges to generate said surfaces of revolution and thus repeatedly to scrape substantially all said wall surfaces, and means for rotating said apparatus as a whole, while said blades are being rotated, about an axis that results in flow of material being mixed back onto said wall surfaces.

ORTON B. BROWN.